(12) United States Patent
Negishi et al.

(10) Patent No.: US 8,977,395 B2
(45) Date of Patent: Mar. 10, 2015

(54) ROBOT CONTROL APPARATUS, ROBOT CONTROL METHOD, PROGRAM, AND RECORDING MEDIUM

(75) Inventors: Mahito Negishi, Tachikawa (JP);
Hideaki Suzuki, Kawasaki (JP);
Shinsuke Iizuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/006,638

(22) PCT Filed: Mar. 19, 2012

(86) PCT No.: PCT/JP2012/001880
§ 371 (c)(1),
(2), (4) Date: Sep. 20, 2013

(87) PCT Pub. No.: WO2012/127845
PCT Pub. Date: Sep. 27, 2012

(65) Prior Publication Data
US 2014/0012416 A1    Jan. 9, 2014

(30) Foreign Application Priority Data
Mar. 24, 2011    (JP) ................................. 2011-066000

(51) Int. Cl.
*G05B 19/18*    (2006.01)
*B25J 9/16*    (2006.01)
*G05B 19/04*    (2006.01)

(52) U.S. Cl.
CPC .............. *B25J 9/1607* (2013.01); *B25J 9/1679* (2013.01); *B25J 9/1697* (2013.01); *G05B 2219/39022* (2013.01); *G05B 2219/39063* (2013.01); *G05B 2219/40609* (2013.01)

USPC ............ 700/251; 700/248; 700/250; 700/252

(58) Field of Classification Search
USPC ......................................................... 700/251
See application file for complete search history.

(56) References Cited

U.S. PATENT DOCUMENTS 6,236,896 B1    5/2001    Watanabe et al.
7,424,341 B2 *  9/2008    Watanabe et al. ............. 700/245
(Continued)

FOREIGN PATENT DOCUMENTS

CN    1704210 A    12/2005
CN    1802240 A    7/2006
(Continued)

*Primary Examiner* — Ian Jen
(74) *Attorney, Agent, or Firm* — Canon USA Inc IP Division

(57) ABSTRACT

A first coordinate system $C_A$ of the hand unit, a second coordinate system $C_B$ of the first workpiece, and a third coordinate system $C_C$ of a second workpiece in a camera coordinate system are calculated (S2, S3, and S4). First and second coordinate transformation matrices $^AT_B$ and $^AT_C$ are calculated (S5 and S6). Coordinate data of a target point is set in the coordinate system of the first workpiece (S7). Coordinate data of an instruction point is set in the coordinate system of the second workpiece (S8). The coordinate data of the target point is subjected to coordinate transformation using the first coordinate transformation matrix $^AT_B$ (S9). The coordinate data of the instruction point is subjected to coordinate transformation using the second coordinate transformation matrix $^AT_C$ (S10). Operation instructions are generated using the converted coordinate data (S11).

9 Claims, 9 Drawing Sheets

(56) References Cited

U.S. PATENT DOCUMENTS

| | | | |
|---|---|---|---|
| 7,904,202 B2 * | 3/2011 | Hoppe | 700/245 |
| 2003/0200042 A1 * | 10/2003 | Gan et al. | 702/105 |
| 2004/0172164 A1 | 9/2004 | Habibi et al. | |
| 2004/0243282 A1 * | 12/2004 | Watanabe et al. | 700/259 |
| 2004/0251866 A1 | 12/2004 | Gan et al. | |
| 2005/0166413 A1 * | 8/2005 | Crampton | 33/503 |
| 2008/0235970 A1 * | 10/2008 | Crampton | 33/503 |
| 2009/0118864 A1 * | 5/2009 | Eldridge et al. | 700/259 |

FOREIGN PATENT DOCUMENTS

| | | |
|---|---|---|
| CN | 101204813 A | 6/2008 |
| JP | H05-108126 A | 4/1993 |
| JP | H08-174457 A | 7/1996 |
| JP | 2005-515910 A | 6/2005 |

* cited by examiner

US 8,977,395 B2

ROBOT CONTROL APPARATUS, ROBOT CONTROL METHOD, PROGRAM, AND RECORDING MEDIUM

TECHNICAL FIELD

The present invention relates to a robot control apparatus capable of attaching an object grasped by a robot to another object, a robot control method, a program, and a recording medium.

BACKGROUND ART

A robot which includes a robot body having a multijoint arm unit including a plurality of link members and a hand unit disposed in an end of the arm unit and which grasps an object serving as a first workpiece using the hand unit and attaches the grasped object to another object serving as a second workpiece has been generally used.

Furthermore, various techniques of measuring a position using a camera including a stereo method have been used, and a 3D position of a feature point of an object included in an image captured by a camera can be measured by such a technique. Furthermore, a position and orientation of an object can be measured by measuring a plurality of feature points of an object. Moreover, various techniques of measuring a position using a phototransmitter and a photoreceiver in combination instead of a camera have been used.

In general, a mechanism configured such that a camera which is used to capture an image of a grasped object and another object so as to measure positions and orientations of the grasped object and the other object is fixed to a camera-mounting stage disposed over an operation position in which the grasped object is attached to the other object by the robot body has been used (refer to PTL 1). Furthermore, a camera fixed to the hand unit of the robot body has been used (refer to PTL 2).

Here, if the hand unit grasps different positions of the object at different times, it is difficult to accurately attach the grasped object to the other object. Therefore, results of measurements of positions and orientations of the grasped object and the other object should be fed back so that operation instructions for specifying a trajectory of the robot body are generated.

Here, the positions and orientations of the grasped object and the other object are calculated by a camera on the basis of a camera coordinate system whereas the operation instructions generated to operate the robot body in a predetermined trajectory are based on a robot coordinate system. Therefore, a coordinate transformation matrix used to transfer coordinate data representing the measured positions and orientations in the camera coordinate system into coordinate data in the robot coordinate system should be obtained.

Accordingly, in general, since it is estimated that the position and orientation of the camera fixed to the camera-mounting stage in the camera coordinate system is constant relative to the robot coordinate system, a coordinate transformation matrix including preset constant values has been used.

Furthermore, when the camera is fixed to the hand unit, the position and orientation in the camera coordinate system is changed relative to the robot coordinate system in response to an operation of the robot body. Accordingly, the position and orientation in the camera coordinate system relative to the robot coordinate system can be estimated in accordance with a position and orientation of an end of a hand obtained in accordance with the direct kinematics using joint angles of the robot body. The coordinate transformation matrix is generally calculated in accordance with the relationship between the camera coordinate system and the robot coordinate system estimated as described above.

CITATION LIST

Patent Literature

PTL 1: Japanese Patent Laid-Open No. 5-108126
PTL 2: Japanese Patent Laid-Open No. 8-174457

SUMMARY OF INVENTION

Technical Problem

In recent years, a more accurate assembly operation performed by a robot body has been highly demanded. For example, an operation of connecting a connector disposed in a tip end of a flexible cable to a connector of an electronic apparatus performed by a robot body has been demanded.

However, in general, it is considered that a position of a camera relative to a fixed object such as a camera-mounting stage or a hand unit is fixed, that is, a camera coordinate system relative to a robot coordinate system is obtained in advance or can be derived. Therefore, a shift of a position and orientation in the camera coordinate system has not been expected.

However, from a practical standpoint, the position and orientation in the camera coordinate system varies due to various reasons. For example, the camera-mounting stage may be shaken in accordance with an operation of a robot and a mounting position may be shifted due to a change of an environmental temperature or a change of a temperature of the camera. Similarly, when the camera is fixed to the hand unit, the position of the camera may be shifted relative to the hand unit. Specifically, from a practical standpoint, the position of the camera is shifted, and therefore, it is difficult to accurately specify the position and orientation in the camera coordinate system on the basis of the robot coordinate system. Furthermore, since an assembling position is shifted due to a shift of the position of the camera, it is difficult to perform the accurate assembly operation.

In particular, when an object to be grasped by the hand unit is not a rigid body but a flexible body (soft body), a position and orientation of the object to be grasped is considerably changed depending on an orientation of the hand unit or a grasped position. Accordingly, accuracy of coordinate data of the position and orientation of the grasped object which is converted into coordinate data in the robot coordinate system is particularly important. However, when the position of the camera varies, accuracy of the calculated coordinate data in the robot coordinate system is degraded. Therefore, it is difficult to perform the accurate assembly operation, and particularly, it is difficult when the grasped object is a flexible body.

Accordingly, the present invention provides a robot control apparatus capable of performing control such that correction of coordinate data between a camera coordinate system and a robot coordinate system is not required even when a camera position is shifted and accurate assembly is performed even when a position in a first workpiece grasped by the hand unit is shifted or the first workpiece is deformed, a robot control method, a program, and a recording medium.

Solution to Problem

According to an embodiment of the present invention, there is provided a robot control apparatus controlling a robot body including an arm unit having a plurality of link members coupled with one another and a hand unit which is disposed at an end of the arm unit, which grasps a first workpiece, and which attaches the grasped first workpiece to a second workpiece. The robot control apparatus includes a camera configured to output image data obtained by capturing an image of the robot body, the first workpiece, and the second workpiece, a first coordinate system calculation unit configured to calculate a first coordinate system representing a position and orientation of the hand unit in a camera coordinate system of the camera from the image data, a second coordinate system calculation unit configured to calculate a second coordinate system representing a position and orientation of the first workpiece in the camera coordinate system of the camera from the image data, a third coordinate system calculation unit configured to calculate a third coordinate system representing a position and orientation of the second workpiece in the camera coordinate system of the camera from the image data, a first coordinate transformation matrix calculation unit configured to calculate a first coordinate transformation matrix used to transfer the second coordinate system into the first coordinate system, a second coordinate transformation matrix calculation unit configured to calculate a second coordinate transformation matrix used to transfer the third coordinate system into the first coordinate system, a target-point setting unit configured to set, in a coordinate system of the first workpiece, coordinate data of a target point having a constant position and orientation relative to the first workpiece, an instruction-point setting unit configured to set, in a coordinate system of the second workpiece, coordinate data of an instruction point which allows the target point to pass in a constant position and orientation relative to the second workpiece, a first coordinate transformation unit configured to perform coordinate transformation on the coordinate data of the target point set by the target-point setting unit using the first coordinate transformation matrix, a second coordinate transformation unit configured to perform coordinate transformation on the coordinate data of the instruction point set by the instruction-point setting unit using the second coordinate transformation matrix, an operation instruction generation unit configured to generate operation instructions for operating the robot body so that the robot body traces a trajectory obtained such that the coordinate data of the target point which has been subjected to the coordinate transformation by the first coordinate transformation unit passes a position of the coordinate data of the instruction point which has been subjected to the coordinate transformation by the second coordinate transformation unit, and an operation instruction output unit configured to output the operation instructions generated by the operation instruction generation unit to the robot body.

According to another embodiment of the present invention, there is provided a robot control method for controlling a robot body including an arm unit having a plurality of link members coupled with one another and a hand unit which is disposed at an end of the arm unit, which grasps a first workpiece, and which attaches the grasped first workpiece to a second workpiece. The robot control method includes an image capturing step of obtaining image data by capturing an image of the robot body, the first workpiece, and the second workpiece using a camera, a first coordinate system calculation step of calculating a first coordinate system representing a position and orientation of the hand unit in a camera coordinate system of the camera from the image data, a second coordinate system calculation step of calculating a second coordinate system representing a position and orientation of the first workpiece in the camera coordinate system of the camera from the image data, a third coordinate system calculation step of calculating a third coordinate system representing a position and orientation of the second workpiece in the camera coordinate system of the camera from the image data, a first coordinate transformation matrix calculation step of calculating a first coordinate transformation matrix used to transfer the second coordinate system into the first coordinate system, a second coordinate transformation matrix calculation step of calculating a second coordinate transformation matrix used to transfer the third coordinate system into the first coordinate system, a target-point setting step of setting, in a coordinate system of the first workpiece, coordinate data of a target point having a constant position and orientation relative to the first workpiece, an instruction-point setting step of setting, in a coordinate system of the second workpiece, coordinate data of an instruction point which allows the target point to pass in a constant position and orientation relative to the second workpiece, a first coordinate transformation step of performing coordinate transformation on the coordinate data of the target point set in the target-point setting step using the first coordinate transformation matrix, a second coordinate transformation step of performing coordinate transformation on the coordinate data of the instruction point set in the instruction-point setting step using the second coordinate transformation matrix, an operation instruction generation step of generating operation instructions for operating the robot body so that the robot body traces a trajectory obtained such that the coordinate data of the target point which has been subjected to the coordinate transformation in the first coordinate transformation step passes a position of the coordinate data of the instruction point which has been subjected to the coordinate transformation in the second coordinate transformation step, and an operation instruction output step of outputting the operation instructions generated in the operation instruction generation step to the robot body.

According to still another embodiment of the present invention, there is provided a program which causes a computer which controls a robot body including an arm unit having a plurality of link members coupled with one another and a hand unit which is disposed at an end of the arm unit, which grasps a first workpiece, and which attaches the grasped first workpiece to a second workpiece to execute an image capturing step of obtaining image data by capturing an image of the robot body, the first workpiece, and the second workpiece using a camera, a first coordinate system calculation step of calculating a first coordinate system representing a position and orientation of the hand unit in a camera coordinate system of the camera from the image data, a second coordinate system calculation step of calculating a second coordinate system representing a position and orientation of the first workpiece in the camera coordinate system of the camera from the image data, a third coordinate system calculation step of calculating a third coordinate system representing a position and orientation of the second workpiece in the camera coordinate system of the camera from the image data, a first coordinate transformation matrix calculation step of calculating a first coordinate transformation matrix used to transfer the second coordinate system into the first coordinate system, a second coordinate transformation matrix calculation step of calculating a second coordinate transformation matrix used to transfer the third coordinate system into the first coordinate system, a target-point setting step of setting, in a coordinate system of the first workpiece, coordinate data of a target point having a constant position and orientation relative to the first workpiece, an instruction-point setting step of setting, in a coordinate system of the second workpiece, coordinate data of an instruction point which allows the target point to pass in a constant position and orientation relative to the second workpiece, a first coordinate transformation step of performing coordinate transformation on the coordinate data of the target point set in the target-point setting step using the first coordinate transformation matrix, a second coordinate transformation step of performing coordinate transformation on the coordinate data of the instruction point set in the instruction-point setting step using the second coordinate transformation matrix, an operation instruction generation step of generating operation instructions for operating the robot body so that the robot body traces a trajectory obtained such that the coordinate data of the target point which has been subjected to the coordinate transformation in the first coordinate transformation step passes a position of the coordinate data of the instruction point which has been subjected to the coordinate transformation in the second coordinate transformation step, and an operation instruction output step of outputting the operation instructions generated in the operation instruction generation step to the robot body.

According to a further embodiment of the present invention, there is provided a recording medium which is a computer-readable recording medium which stores the program.

Advantageous Effects of Invention

Accordingly, even when the position of the first workpiece grasped by the hand unit is shifted or the first workpiece is deformed, accurate assembly is realized. Furthermore, even when a position of the camera is shifted, accurate assembly is realized.

DESCRIPTION OF EMBODIMENTS

Embodiments of the present invention will be described hereinafter with reference to the accompanying drawings.

First Embodiment

Figure 1:
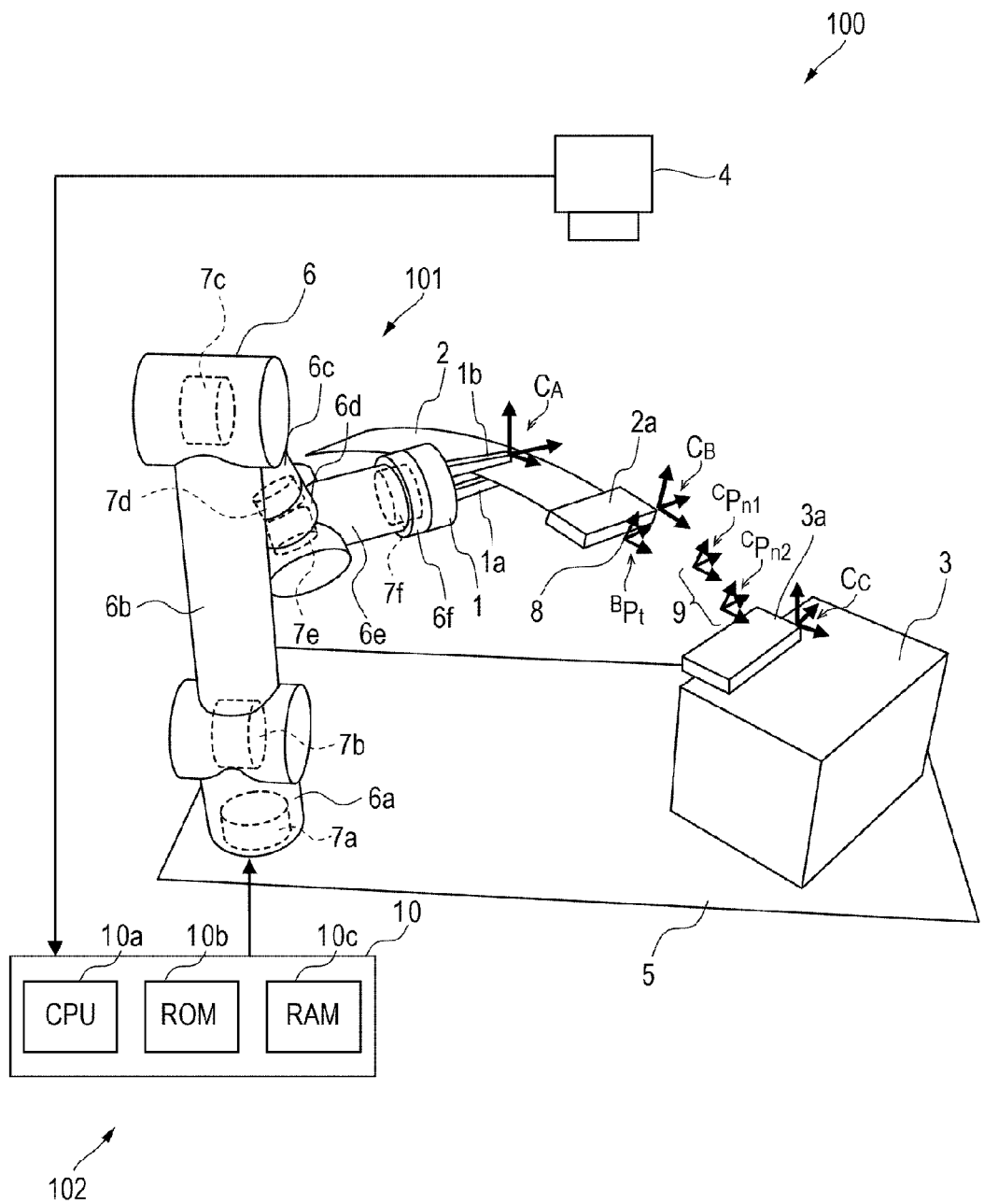
FIG. 1 is a diagram schematically illustrating a configuration of a robot according to a first embodiment of the present invention.

FIG. 1 is a diagram schematically illustrating a configuration of a robot according to a first embodiment of the present invention. A robot 100 includes a robot body 101 and a robot control apparatus 102 which controls the robot body 101.

The robot body 101 includes multijoint arm unit 6 including a plurality of link members 6a to 6f and a hand unit 1 disposed at an end of the arm unit 6. The arm unit 6 includes the link members 6a to 6f coupled with each other in series and may swing or rotate at joint portions.

Among the link members 6a to 6f, the link member 6a disposed in a proximal end (one end) of the arm unit 6 is fixed to a fixing surface (upper surface) of a base 5. Furthermore, the hand unit 1 is attached to the link member 6f disposed in a distal end (the other end) of the arm unit 6 among the link members 6a to 6f. The hand unit 1 of this embodiment includes a pair of fingers 1a and 1b and can grasp an object or release the object by opening and closing the pair of fingers 1a and 1b. Furthermore, the robot body 101 has a plurality of driving units 7a to 7f which drive the link members 6a to 6f and the hand unit 1 so that the link members 6a to 6f and the hand unit 1 rotate or swing. The driving units 7a to 7f are electric motors, for example.

In this embodiment, a case where the object (first workpiece) to be grasped by the hand unit 1 is a flexible cable 2 including a connector 2a at an end portion thereof will be described. Furthermore, a case where the connector 2a of the flexible cable 2 is attached to (or coupled with) a connector 3a which is another object (second workpiece) will be described. The connector 3a is part of an electronic apparatus 3 which is fixed to the fixing surface of the base 5.

The robot control apparatus 102 includes a camera 4 and a robot controller (hereinafter simply referred to as a "controller") 10 which obtains image data output from the camera 4, calculates a coordinate transformation matrix, and controls the robot body 101 (driving unit). Note that the camera 4 is a so-called digital still camera and may be referred to as a visual sensor or a vision. However, in this embodiment, the camera 4 is referred to as a "camera" including the meanings of the digital still camera, the visual sensor, and the vision. The camera 4 is fixed on a camera-mounting stage, not shown, in a position in which the camera 4 can capture an image of the robot body 101 (particularly the hand unit 1), the cable 2 (particularly, the connector 2a), and the connector 3a (that is, in a position in which the robot body 101, the flexible cable 2, and the connector 3a are included in a single image), e.g., a position directly over the base 5.

The controller 10 includes a CPU 10a serving as a computer, a ROM 10b, and a RAM 10c. The ROM 10b stores programs used by the CPU 10a to control the entire robot 100 and a plurality of commands described by a robot language. The commands are used to operate the robot body 101 and described on the basis of a coordinate system of the robot body 101 (robot coordinate system). The RAM 10c is a memory which temporarily stores data and the like.

Figure 2:
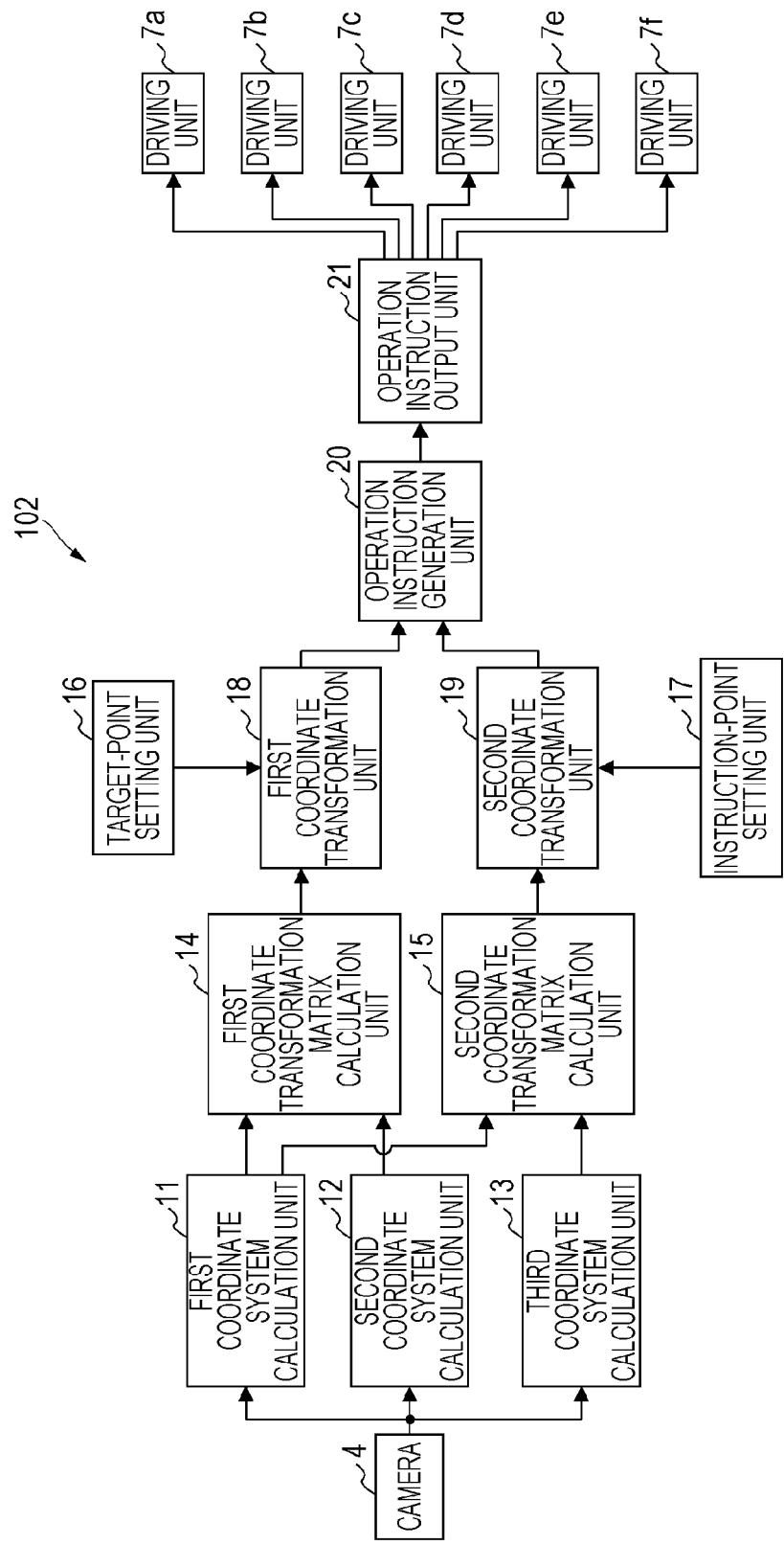
FIG. 2 is a functional block diagram illustrating a robot controller according to the first embodiment of the present invention.

FIG. 2 is a functional block diagram illustrating the controller 10. The controller 10 includes first to third coordinate system calculation units 11 to 13 and first and second coordinate transformation matrix calculation units 14 and 15. The controller 10 further includes a target-point setting unit 16, an instruction-point setting unit 17, first and second coordinate transformation units 18 and 19, an operation instruction generation unit 20, and an operation instruction output unit 21. Specifically, the CPU 10a functions as the first coordinate system calculation unit 11 to the operation instruction output unit 21 by reading and executing the programs recorded in the ROM 10b. Note that, although the controller 10 includes the single CPU 10a as illustrated in FIG. 1, the present invention is not limited to this, and the controller 10 may include a plurality of CPUs which share the functions of the first coordinate system calculation unit 11 to the operation instruction output unit 21. When the controller 10 includes two CPUs, for example, one of the CPUs may function as the first coordinate system calculation unit 11 to the second coordinate transformation unit 19 and the other may function as the operation instruction generation unit 20 and the operation instruction output unit 21.

Hereinafter, an operation of the robot control apparatus 102 will be described with reference to an operation flowchart illustrated in FIG. 3. First, the CPU 10a operates the camera 4 and causes the camera 4 to capture an image of the robot body 101 (particularly the hand unit 1), the cable 2, and the connector 3a. In the image represented by image data obtained by this capturing operation, the robot body 101 (particularly the hand unit 1), the cable 2, and the connector 3a are captured. Then the camera 4 outputs the image data obtained as a result of the image capturing, and the CPU 10a obtains the image data output from the camera 4 (in step S1: an image capturing process). Note that the image capturing is performed immediately after the hand unit 1 grasps the cable 2.

Next, the first coordinate system calculation unit 11 calculates a first coordinate system $C_A$ fixed to the hand unit 1 from the image data obtained from the camera 4 (in step S2: a first coordinate system calculation process). Furthermore, the second coordinate system calculation unit 12 calculates a second coordinate system $C_B$ fixed to the connector 2a from the image data obtained from the camera 4 (in step S3: a second coordinate system calculation process). Moreover, the third coordinate system calculation unit 13 calculates a third coordinate system $C_C$ fixed to the connector 3a from the image data obtained from the camera 4 (in step S4: a third coordinate system calculation process). Note that the order of the operations in step S2 to step S4 is not limited to this, and any one of the operations in step S2 to step S4 may be performed first.

The first coordinate system $C_A$, the second coordinate system $C_B$, and the third coordinate system $C_C$ obtained in step S2 to step S4 are relative coordinate systems based on the camera coordinate system of the camera 4 and represent positions and orientations of the hand unit 1, the cable 2 (connector 2a), and the connector 3a, respectively, in the camera coordinate system.

Figure 4:
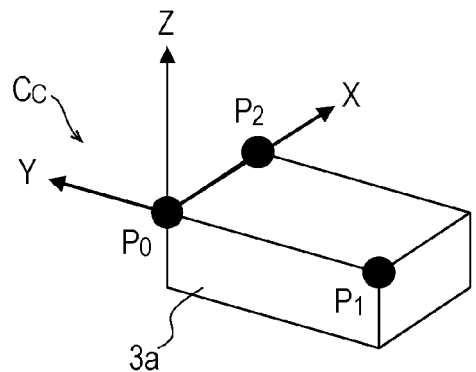
FIG. 4 is a diagram illustrating a connector in image data.

Hereinafter, an operation of obtaining the third coordinate system $C_C$ will be described with reference to a concrete example. Note that only the third coordinate system $C_C$ will be described since the first coordinate system $C_A$ and the second coordinate system $C_B$ can be similarly obtained. FIG. 4 is a diagram illustrating the connector 3a in the image data. First, the third coordinate system calculation unit 13 measures a plurality of feature points of the connector 3a, i.e., 3D coordinate positions $P_0$, $P_1$, and $P_2$ corresponding to three vertices (feature points) of a cube from the image data obtained by the camera 4. This operation is performed by general image processing.

Next, a normal direction of a plane including the coordinate positions $P_0$, $P_1$, and $P_2$ of the three feature points is determined as a Z axis. A direction of the Z axis corresponds to a direction in which a right screw proceeds when being rotated in a direction from the coordinate position $P_0$ through the coordinate position $P_1$ to the coordinate position $P_2$. Next, an axis which passes the two feature points, i.e., the coordinate positions $P_0$ and $P_2$, is determined to be an X axis and the X axis directs from the coordinate point $P_0$ to the coordinate point $P_2$. Next, an axis orthogonal to the X axis and the Z axis is determined to be a Y axis. The coordinate point $P_0$ is determined to be an origin.

In this way, the third coordinate $C_C$ is obtained. Specifically, the third coordinate system $C_C$ is represented by a matrix of four rows and four columns as shown in Expression (1).

[Math. 1]

$$C_C = \begin{bmatrix} x0 & x1 & x2 & x \\ y0 & y1 & y2 & y \\ z0 & z1 & z2 & z \\ 0 & 0 & 0 & 1 \end{bmatrix} \quad (1)$$

Here, "(x0, y0, z0)" denotes a unit vector in the X axis direction, "(x1, y1, z1)" denotes a unit vector in the Y axis direction, and "(x2, y2, z2)" denotes a unit vector in the Z axis direction in the camera coordinate system. Furthermore, "(x, y, z)" denotes the origin.

This is true for the other coordinate systems $C_A$ and $C_B$. Specifically, the three coordinate systems $C_A$, $C_B$, and $C_C$ are obtained from nine (3 by 3) measurement points in total.

Next, the first coordinate transformation matrix calculation unit 14 calculates a first coordinate transformation matrix $^AT_B$ which represents a position and orientation in the second coordinate system $C_B$ relative to the first coordinate system $C_A$ (in step S5: a first coordinate transformation matrix calculation process). Furthermore, the second coordinate transformation matrix calculation unit 15 calculates a second coordinate transformation matrix $^AT_C$ which represents a position and orientation in the third coordinate system $C_C$ relative to the first coordinate system $C_A$ (in step S6: a second coordinate transformation matrix calculation process). Note that the order of the operations in step S5 and step S6 is not limited to this and any one of the operations in step S5 and step S6 may be performed first.

Here, the first coordinate transformation matrix $^AT_B$ represents a position and orientation in the second coordinate system $C_B$ relative to the first coordinate system $C_A$ whereas the second coordinate transformation matrix $^AT_C$ represents a position and orientation in the third coordinate system $C_C$ relative to the first coordinate system $C_A$. Specifically, the first coordinate transformation matrix $^AT_B$ may transfer coordinate data representing the position and orientation in the second coordinate system $C_B$ into coordinate data representing the position and orientation in the first coordinate system $C_A$. Similarly, the second coordinate transformation matrix $^AT_C$ may transfer coordinate data representing the position and orientation in the third coordinate system $C_C$ into coordinate data representing the position and orientation in the first coordinate system $C_A$.

The relative positions and orientations among the three coordinate systems $C_A$, $C_B$, and $C_C$, that is, coordinate transformation, can be represented by Expression (2) below in accordance with a coordinate transformation matrix of four rows and four columns frequently used in robot engineering.

[Math. 2]

$$C_B = C_A {}^A T_B$$

$$C_C = C_A {}^A T_C \quad (2)$$

Obtainment of the relative positions and orientations among the coordinate systems $C_A$, $C_B$, and $C_C$ using the camera 4 is the same as obtainment of the two coordinate transformation matrices $^{A}T_{B}$ and $^{A}T_{C}$. The two coordinate transformation matrices $^{A}T_{B}$ and $^{A}T_{C}$ representing the relative positions are obtained from Expression (3) below which is obtained by altering Expression (2). This coordinate transformation matrix includes four rows and four columns.

[Math. 3]

$$^{A}T_{B} = \text{inv}(C_{A})C_{B}$$

$$^{A}T_{C} = \text{inv}(C_{A})C_{C} \qquad (3)$$

Here, "inv( )" represents an inverse matrix. Note that the third coordinate system $C_{C}$ and a third coordinate transformation matrix $^{B}T_{C}$ representing a position and orientation of the third coordinate system $C_{C}$ relative to the second coordinate system $C_{B}$ are represented by Expression (4) below.

[Math. 4]

$$C_{C} = C_{B}{}^{B}T_{C}$$

$$^{B}T_{C} = \text{inv}(C_{B})C_{C} \qquad (4)$$

Accordingly, although the second coordinate transformation matrix $^{A}T_{C}$ may be obtained in accordance with Expression (5) below, a calculation result is the same as that of Expression (3).

[Math. 5]

$$^{A}T_{C} = {}^{A}T_{B}{}^{B}T_{C} \qquad (5)$$

Meanwhile a motion of the robot body 101 may be generated using a target point 8 fixed to the connector 2a of the cable 2 and instruction points 9 fixed to the connector 3a as illustrated in FIG. 1. As a simple method for generating a trajectory, the target point 8 traces the instruction points 9 such that the points are connected.

Therefore, first, the target-point setting unit 16 sets coordinate data $^{B}P_{t}$ of the target point 8 having a fixed position and orientation relative to the cable 2 in a coordinate system of the cable 2 (in step S7: a target-point setting process). Note that the coordinate system of the cable 2 is a relative coordinate system based on the coordinate system of the robot body 101 (robot coordinate system). Although the coordinate system (matrix) of the cable 2 relative to the robot coordinate system has not been obtained, the coordinate data $^{B}P_{t}$ of the target point 8 in the coordinate system of the cable 2 is set as a fixed value irrespective of a position and orientation of the cable 2.

Furthermore, the instruction-point setting unit 17 sets, in a coordinate system of the connector 3a, coordinate data $^{C}P_{n1}$ and $^{C}P_{n2}$ of the instruction points 9 used to cause the target point 8 to pass in a fixed position and orientation relative to the connector 3a (in step S8: an instruction-point setting process). In this embodiment, a plurality of coordinate data (two coordinate data) of the instruction point 9 is set. Here, the coordinate system of the connector 3a is a relative coordinate system based on the robot coordinate system. Although the coordinate system (matrix) of the connector 3a relative to the robot coordinate system has not been obtained, coordinate data $^{C}P_{n1}$ and coordinate data $^{C}P_{n2}$ of the instruction points 9 in the coordinate system of the connector 3a are set as fixed values irrespective of a position and orientation of the connector 3a. In FIG. 1, the plurality of instruction points 9 which instruct a series of movements performed until the connector 2a is connected to the connector 3a are set.

The coordinate data $^{B}P_{t}$ of the target point 8 and the coordinate data $^{C}P_{n1}$ and the coordinate data $^{C}P_{n2}$ of the instruction points 9 are stored in the ROM 10b as commands described using the robot language. In step S7 and step S8, the CPU 10a reads the commands from the ROM 10b and interprets the commands so as to store the commands as the coordinate data $^{B}P_{t}$, the coordinate data $^{C}P_{n1}$, and the coordinate data $^{C}P_{n2}$ in the RAM 10c.

Note that an order of the operations in step S7 and step S8 is not limited to this and any one of the operations in step S7 and step S8 may be performed first. Furthermore, the operations in step S7 and step S8 may be performed before the operation in step S6.

Here, although the first coordinate transformation matrix $^{A}T_{B}$ is calculated in step S5 on the basis of the camera coordinate system, a relative position and orientation in the coordinate system of the cable 2 relative to the coordinate system of the hand unit 1 in the camera coordinate system is the same as that in the robot coordinate system. Similarly, although the second coordinate transformation matrix $^{A}T_{C}$ is obtained in step S6 on the basis of the camera coordinate system, a relative position and orientation in the coordinate system of the connector 3a relative to the coordinate system of the hand unit 1 in the camera coordinate system is the same as that in the robot coordinate system.

Therefore, the first coordinate transformation unit 18 performs coordinate transformation on the coordinate data $^{B}P_{t}$ of the target point 8 set by the target-point setting unit 16 using the first coordinate transformation matrix $^{A}T_{B}$ so as to obtain coordinate data $^{A}P_{t}$ (in step S9: a first coordinate transformation process). Specifically, the first coordinate transformation unit 18 obtains the coordinate data $^{A}P_{t}$ in accordance with Expression (6) below.

[Math. 6]

$$^{A}P_{1} = {}^{A}T_{B}{}^{B}P_{1} \qquad (6)$$

By this, the coordinate data of the target point 8 is converted from that in the coordinate system of the cable 2 into that in the coordinate system of the hand unit 1. In this case, the coordinate data $^{B}P_{t}$ stored in the RAM 10c is replaced by the coordinate data $^{A}P_{t}$. Here, the coordinate system of the hand unit 1 is a relative coordinate system based on the robot coordinate system.

Furthermore, the second coordinate transformation unit 19 performs coordinate transformation on the coordinate data $^{C}P_{n1}$ and the coordinate data $^{C}P_{n2}$ of the instruction points 9 set by the instruction-point setting unit 17 using the second coordinate transformation matrix $^{A}T_{C}$ so as to obtain coordinate data $^{A}P_{n1}$ and coordinate data $^{A}P_{n2}$ (in step S10: a second coordinate transformation process). Specifically, the second coordinate transformation unit 19 calculates the coordinate data $^{A}P_{n}$ ($^{A}P_{n1}$ and $^{A}P_{n2}$) in accordance with Expression (7) below.

[Math. 7]

$$^{A}P_{n} = {}^{A}T_{C}{}^{C}P_{n} (= {}^{A}T_{B}{}^{B}T_{C}{}^{C}P_{n}) \qquad (7)$$

By this, the coordinate data of the instruction points 9 is converted from that in the coordinate system of the connector 3a into that in the coordinate system of the hand unit 1. In this case, the coordinate data $^{C}P_{n1}$ and the coordinate data $^{C}P_{n2}$ stored in the RAM 10c are replaced by the coordinate data $^{A}P_{n1}$ and the coordinate data $^{A}P_{n2}$.

Figure 5:
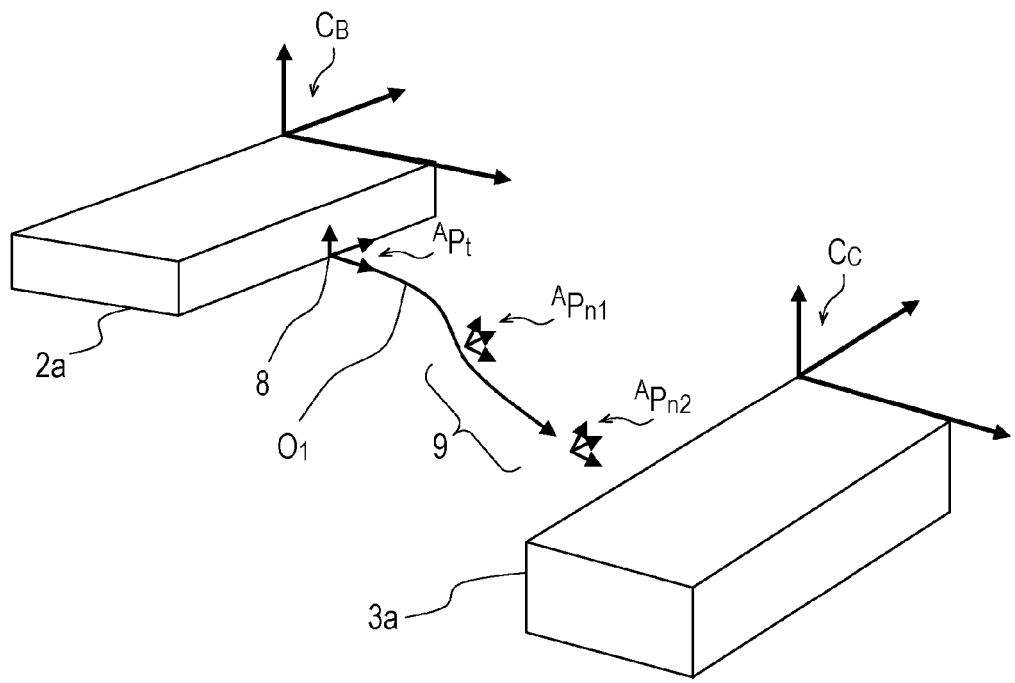
FIG. 5 is a diagram illustrating a trajectory of a first workpiece obtained by the robot according to the first embodiment of the present invention.

Next, the operation instruction generation unit 20 generates a trajectory $O_{1}$ as illustrated in FIG. 5 such that the coordinate data $^{A}P_{t}$ of the target point 8 obtained by performing the coordinate transformation by the first coordinate transformation unit 18 overlaps with the coordinate data $^{A}P_{n1}$ and the coordinate data $^{A}P_{n2}$ of the instruction points 9 obtained by performing the coordinate transformation by the second coordinate transformation unit 19 while the coordinate data $^AP_t$ traces the trajectory $O_1$. Specifically, the CPU 10a calculates the trajectory $O_1$ using the coordinate data $^AP_t$, the coordinate data $^AP_{n1}$, and the coordinate data $^AP_{n2}$ which are stored in the RAM 10c. Note that, although examples of a method for generating the trajectory $O_1$ include a line interpolation method, a spline interpolation method, and an arc interpolation method, the method is not particularly limited to these. The operation instruction generation unit 20 calculates a trajectory of the hand unit 1 using the trajectory $O_1$ and calculates joint angles of the link members 6a to 6f and the hand unit 1 in accordance with the inverse kinematics. Note that the trajectory of the hand unit 1 is calculated on the assumption that the position and orientation of the cable 2 relative to the hand unit 1 is not changed. Then the operation instruction generation unit 20 generates an operation instruction for operating the driving units 7a to 7f of the robot body 101 such that the link members 6a to 6f and the hand unit 1 have the obtained joint angles (in step S11: an operation instruction generation process). This operation instruction represents the joint angles of the link members 6a to 6f and the hand unit 1. In this embodiment, a series of operation instructions from an instruction to be issued for grasping the cable 2 using the hand unit 1 to an instruction to be issued for connecting the connector 2a to the connector 3a is simultaneously generated on the assumption that the coordinate system of the cable 2 relative to the coordinate system of the hand unit 1 is not changed.

Thereafter, the operation instruction output unit 21 outputs the operation instructions generated by the operation instruction generation unit 20 to the driving units 7a to 7f of the robot body 101 (in step S12: an operation instruction output process). The driving units 7a to 7f which have received the instructions swing or rotate the link members 6a to 6f and the hand unit 1 in accordance with the instructions.

By performing the operations in step S1 to step S12 as described above, the connector 2a of the cable 2 grasped by the hand unit 1 of the robot body 101 can be attached to the connector 3a, and accurate assembly can be realized.

Specifically, even when a portion of the cable 2 grasped by the hand unit 1 is shifted, the second coordinate system $C_B$ obtained is changed through calculation, and the change of the second coordinate system $C_B$ affects the first coordinate transformation matrix $^AT_B$ and further affects the coordinate data $^AP_t$ of the target point 8. Specifically, the shift of the position of the cable 2 grasped by the hand unit 1 affects the operation of the robot body 101, and a trajectory of the robot body 101 is corrected. Furthermore, even when the position of the connector 3a is shifted, the third coordinate system $C_C$ obtained through calculation is changed, and the change of the third coordinate system $C_C$ affects the second coordinate transformation matrix $^AT_C$ and further affects the coordinate data $^AP_{n1}$ and the coordinate data $^AP_{n2}$ of the instruction points 9. Specifically, the shift of the position of the connector 3a affects the operation of the robot body 101, and the trajectory of the robot body 101 is corrected. By this, the robot body 101 can be operated with high accuracy and accurate assembly is realized.

Furthermore, even when the cable 2 to be grasped is a flexible body and the cable 2 is deformed, the accurate assembly is realized since the second coordinate system $C_B$ is changed when the cable 2 is deformed.

Moreover, in this embodiment, the relative coordinate transformation matrices $^AT_B$ and $^AT_C$ between the hand unit 1 and the cable 2 and between the hand unit 1 and the connector 3a in the camera coordinate system are obtained. Then, using the coordinate transformation matrices $^AT_B$ and $^AT_C$, the coordinate data of the target point 8 in the coordinate system of the cable 2 and the coordinate data of the instruction points 9 in the coordinate system of the connector 3a on the basis of the robot coordinate system are converted into those in the coordinate system of the hand unit 1. Since the operation instructions are generated in accordance with the coordinate data $^AP_t$, the coordinate data $^AP_{n1}$, and the coordinate data $^AP_{n2}$, the operation instructions finally generated are not affected by the position and orientation of the camera 4. Specifically, since a coordinate transformation matrix for transferring the camera coordinate system into the robot coordinate system is not used, even when the camera 4 is shifted, the shift does not affect the operation instructions finally generated. Accordingly, accurate assembly is realized without accurately measuring and correcting the position and orientation of the camera 4.

Here, when it is likely that the position of the cable 2 relative to the hand unit 1 is shifted when the hand unit 1 is moved, this routine may be performed a number of times. Specifically, the process from the operation of grasping the cable 2 using the hand unit 1 to the operation of connecting the connector 2a to the connector 3a is not entirely performed but is performed in turn in a divided manner. In this case, the process from step S1 to step S12 is executed a number of times corresponding to the number of divisions. Accordingly, even when the cable 2 serving as a grasped object, i.e., the first workpiece, is deformed, accurate assembly is realized.

Second Embodiment

Figure 6:
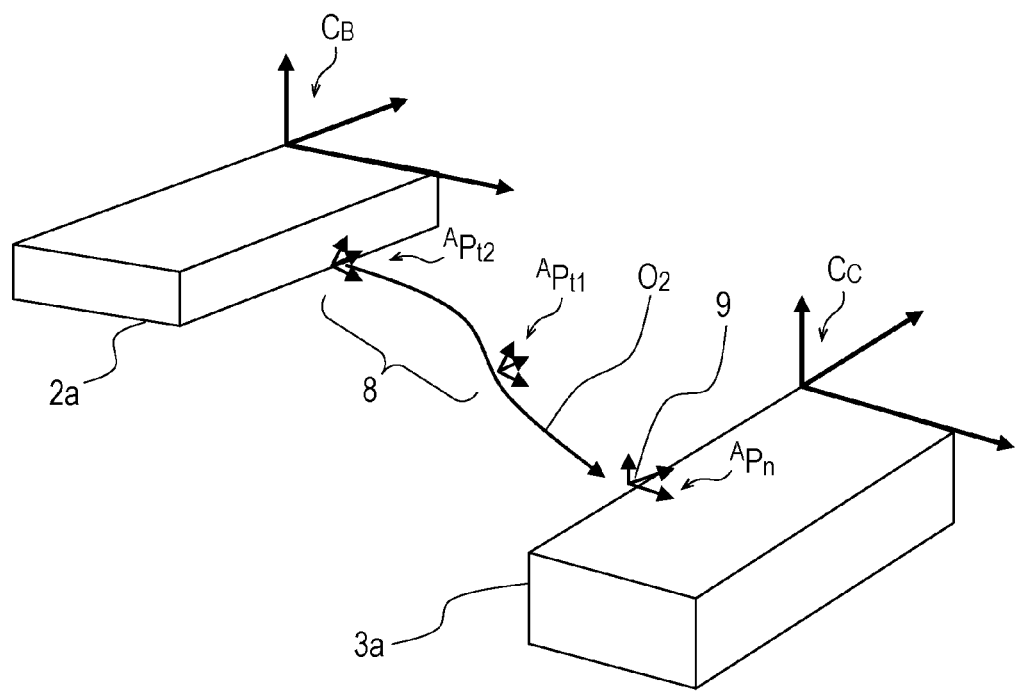
FIG. 6 is a diagram illustrating a trajectory of a first workpiece obtained by a robot according to a second embodiment of the present invention.

Next, a robot according to a second embodiment of the present invention will be described. FIG. 6 is a diagram illustrating a trajectory of a first workpiece obtained by the robot according to the second embodiment of the present invention. Note that a configuration of the robot according to the second embodiment is the same as that of the first embodiment, and therefore, the same reference numerals are used for the description. However, operation of a robot body 101, that is, programs stored in a ROM 10b, is different from that of the first embodiment.

In the first embodiment, a case where the single target point 8 and the plurality of instruction points 9 are set has been described. Furthermore, the operation instructions, that is, the trajectory of the robot body 101, is set such that the target point 8 passes the instruction points 9. In the second embodiment, a plurality of target points 8 and a single instruction point 9 are set. Also in this case, a CPU 10a executes a process substantially the same as that represented by the flowchart of the first embodiment illustrated in FIG. 3. However, the plurality of target points 8 are set in step S7 and coordinate data of the target points 8 are denoted by "$^BP_{t1}$" and "$^BP_{t2}$". In step S9, the coordinate data $^BP_{t1}$ and the coordinate data $^BP_{t2}$ of the target points 8 are converted into coordinate data $^AP_{t1}$ and coordinate data $^AP_{t2}$. Furthermore, the single instruction point 9 is set in step S8, and coordinate data thereof is denoted by "$^CP_n$". In step S10, the coordinate data $^CP_n$ is converted into coordinate data $^AP_n$.

Thereafter, in step S11, the CPU 10a generates a trajectory $O_2$ as illustrated in FIG. 6 such that each of the target points 8 passes the instruction point 9 corresponding to the coordinate data $^AP_n$. The CPU 10a calculates a trajectory of a hand unit 1 using the trajectory $O_2$ and calculates angles of link members 6a to 6f and the hand unit 1 in accordance with the inverse kinematics. Then the CPU 10a generates operation instructions for operating driving units 7a to 7f of the robot body 101 so that the link members 6a to 6f and the hand unit 1 have the obtained angles.

As described above, even when a plurality of coordinate data of the target points 8 are set and single coordinate data of the instruction point 9 is set, the trajectory $O_2$ and operation instructions are generated in the similar manner. Accordingly, the same effect as the first embodiment can be attained. Note that, the same effect is attained even in a case where a single target point 8 and a single instruction point 9 are set and a case where a plurality of target points 8 and a plurality of instruction points 9 are set.

Third Embodiment

Figure 7:
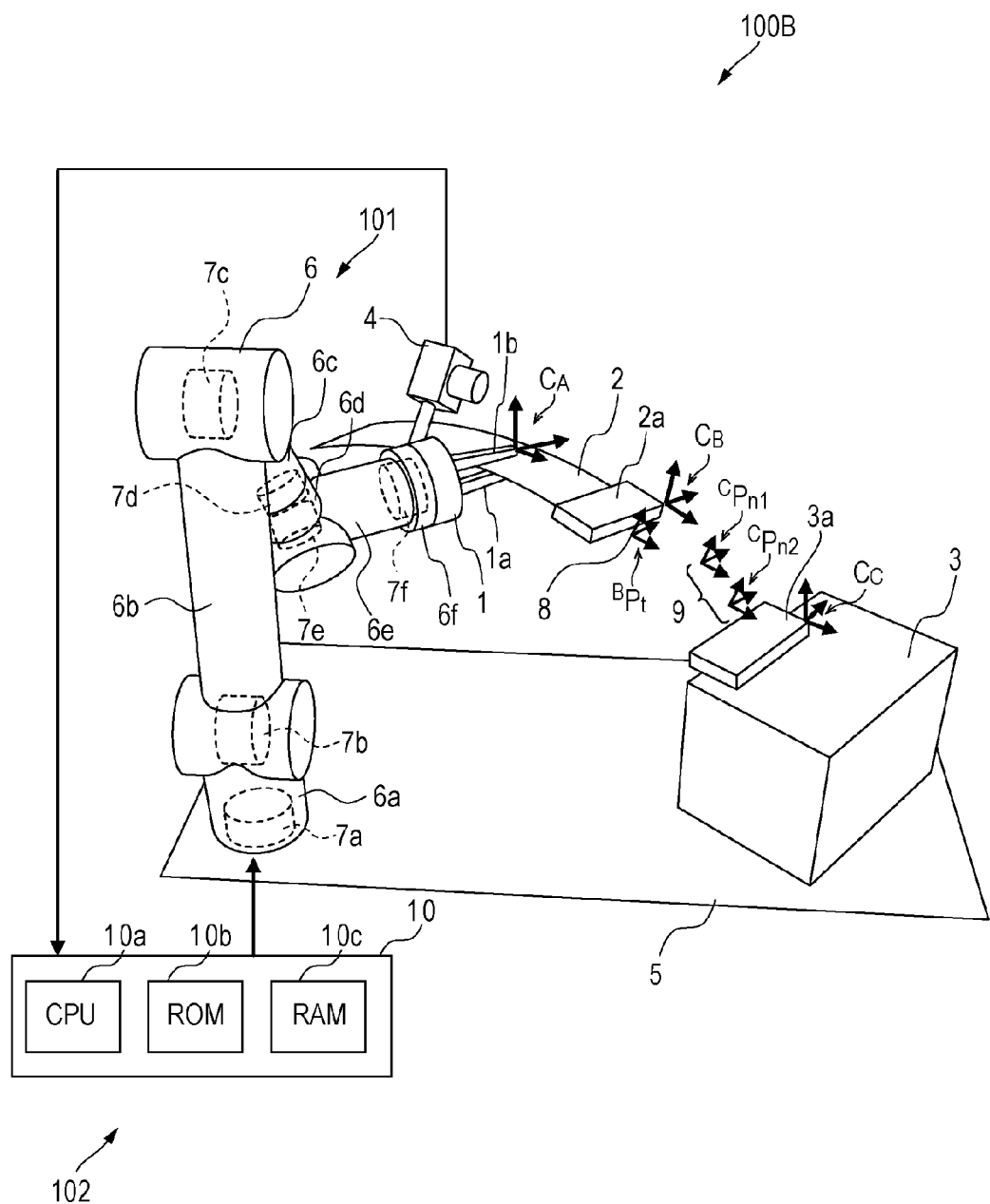
FIG. 7 is a diagram schematically illustrating a configuration of a robot according to a third embodiment of the present invention.

Next, a robot according to a third embodiment of the present invention will be described. FIG. 7 is a diagram schematically illustrating a configuration of a robot 100B according to a third embodiment of the present invention. Although the case where the camera 4 is fixed to the camera-mounting stage, not shown, has been described in the first embodiment, a camera 4 is fixed to a hand unit 1 in the third embodiment. Even when the camera 4 is thus fixed to the hand unit 1, coordinate data of a target point 8 and instruction points 9 in a coordinate system of the hand unit 1 is calculated by coordinate transformation using coordinate transformation matrices $^{A}T_B$ and $^{A}T_C$ irrespective of a position and orientation of the camera 4, and operation instructions are generated in accordance with results of the calculation. Specifically, the operation instructions are generated in accordance with the coordinate data of the target point 8 and the instruction points 9 obtained by the coordinate transformation using the relative coordinate transformation matrices $^{A}T_B$ and $^{A}T_C$ without using a transformation matrix for transferring a camera coordinate system into a robot coordinate system. Accordingly, since the operation instructions can be generated without obtaining a position and orientation in the camera coordinate system relative to the robot coordinate system, the same effect as the first embodiment can be attained, irrespective of the position of the camera 4, even when the camera 4 is fixed to the hand unit 1.

Fourth Embodiment

Figure 8:
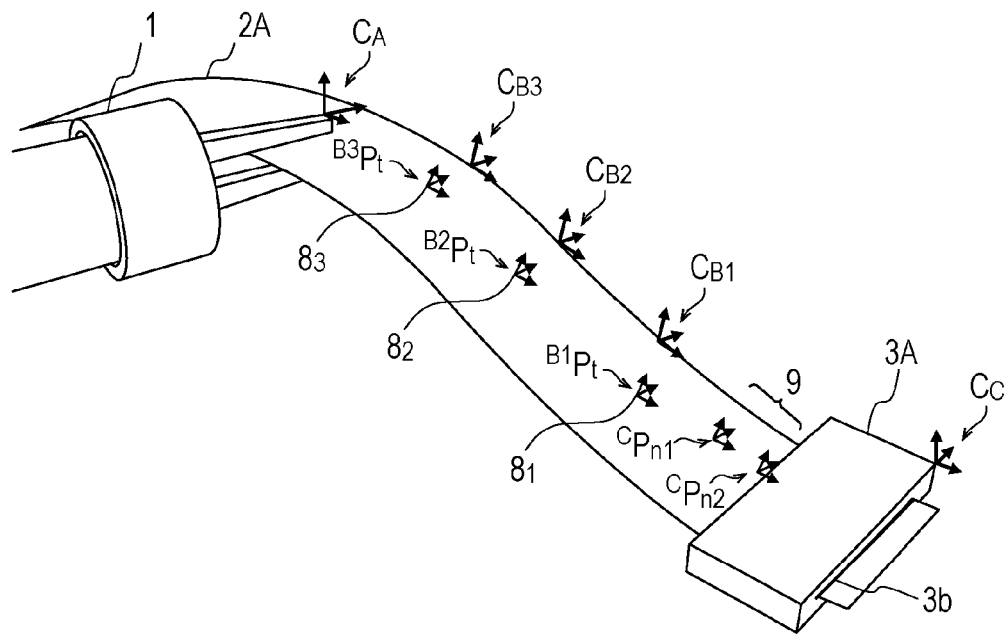
FIG. 8 is a diagram illustrating an operation of causing a long first workpiece to pass a through-hole formed in a second workpiece performed by a robot according to a fourth embodiment of the present invention.
Figure 9:
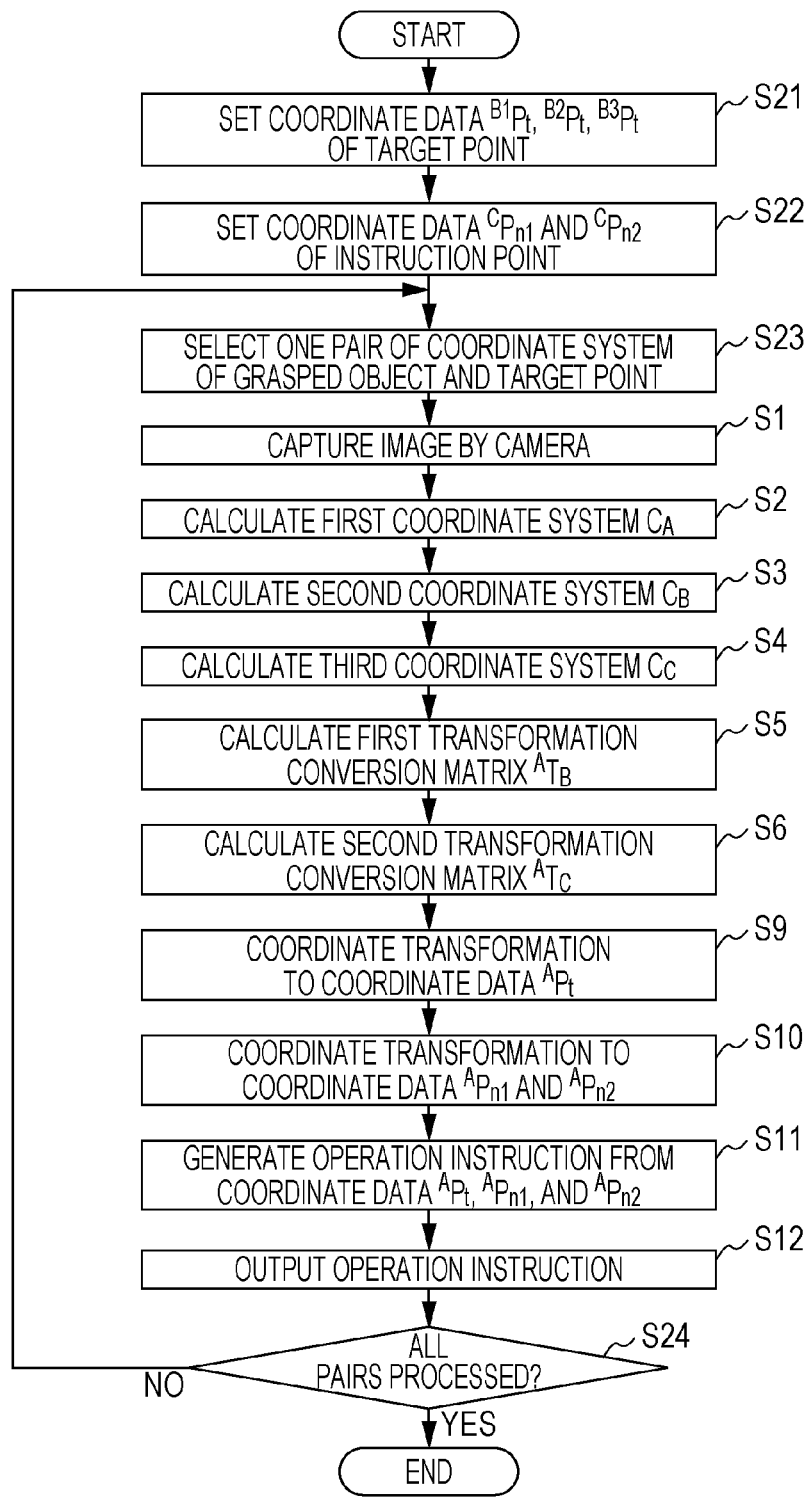
FIG. 9 is a flowchart illustrating an operation of a robot control apparatus according to the fourth embodiment of the present invention.

Next, a robot according to a fourth embodiment of the present invention will be described. FIG. 8 is a diagram illustrating an operation of causing a long first workpiece to pass a through-hole formed in a second workpiece, and FIG. 9 is an operation flowchart illustrating an operation of a robot control apparatus of the robot according to the fourth embodiment of the present invention. Note that components and operations the same as those of the first embodiment are denoted by reference numerals the same as those of the first embodiment.

A grasped object 2A serving as the first workpiece is a long flexible body. An object 3A serving as the second workpiece has a through-hole 3b into which the grasped object 2A is inserted. The robot according to the fourth embodiment performs an operation of inserting the grasped object 2A grasped by a hand unit 1 into the through-hole 3b of the object 3A.

The fourth embodiment is different from the foregoing embodiments in that a plurality of pairs of coordinate systems fixed to the grasped object 2A and coordinate data $^{B}P_t$ of target points 8 are set. In FIG. 8, three pairs are shown. Specifically, in FIG. 8, coordinate systems fixed to the grasped object 2A are denoted by "$C_{B1}$", "$C_{B2}$", and "$C_{B3}$", and coordinate data of the set target points 8 is denoted by "$^{B1}P_t$", "$^{B2}P_t$", and "$^{B3}P_t$". First, a CPU 10a serving as a target-point setting unit sets the coordinate data $^{B1}P_t$, the coordinate data $^{B2}P_t$, and the coordinate data $^{B3}P_t$ of a plurality of target points $8_1$, $8_2$, and $8_3$ in the coordinate systems $C_{B1}$, $C_{B2}$, and $C_{B3}$ which are prescribed in different feature points of the grasped object 2A (in step S21). In step S21 which is a target-point setting process, the target points $8_1$, $8_2$, and $8_3$ are set along a longitudinal direction of the grasped object 2A. The operation in step S21 is performed before step S3 which is a second coordinate system calculation process is performed.

Furthermore, the CPU 10a functioning as an instruction-point setting unit sets coordinate data $^{C}P_{n1}$ and coordinate data $^{C}P_{n2}$ of the instruction points 9 in a coordinate system of the object 3A (in step S22).

Next, the CPU 10a successively selects one of the pairs of the coordinate system $C_{B1}$ and the coordinate data $^{B1}P_t$, the coordinate system $C_{B2}$ and the coordinate data $^{B2}P_t$, and the coordinate system $C_{B3}$ and the coordinate data $^{B3}P_t$ (in step S23: a selection process). Specifically, the CPU 10a selects one of the target points $8_1$, $8_2$, and $8_3$ which has not passed the instruction point (the nearest target point $8_1$ to the instruction points in FIG. 8). Since the CPU 10a is a long flexible body like a band, first, the pair of the coordinate system $C_{B1}$ and the coordinate data $^{B1}P_t$ of the target point $8_1$ is selected. Subsequently, the pair of the coordinate system $C_{B2}$ and the coordinate data $^{B2}P_t$ of the target point $8_2$ and the pair of the coordinate system $C_{B3}$ and the coordinate data $^{B3}P_t$ of the target point $8_3$ are selected in this order.

Although the same process as the first embodiment is performed in step S1 to step S12, in step S3, a second coordinate system $C_B$ of the selected pair is calculated. Specifically, in step S3, the CPU 10a extracts the feature point which prescribes the coordinate system $C_{B1}$ corresponding to the target point $8_1$ selected in step S23 from image data, and calculates the second coordinate system $C_B$ from the extracted feature point.

Then, in step S9, the CPU 10a performs coordinate transformation on the coordinate data of the target point selected in step S23 from among the target points $8_1$, $8_2$, and $8_3$ set in step S21 using a first coordinate transformation matrix $^{A}T_B$. For example, the CPU 10a performs coordinate transformation on the coordinate data $^{B1}P_t$ of the target point $8_1$ of the selected pair so as to obtain coordinate data $^{A1}P_t$.

In step S11, a trajectory of a robot body 101, that is, operation instructions, is calculated using the target points 8 and the instruction points 9, and in step S12, the robot body 101 operates in accordance with the operation instructions. As a result, part of the operation of causing the grasped object 2A having a band shape to pass through the through-hole 3b of the object 3A is realized.

Subsequently, the CPU 10a determines whether all the pairs of the coordinate systems $C_B$ and the target points 8 have been processed (in step S24: a determination process). When the determination is negative in step S24, the process returns to step S1 and the process is continued. Specifically, the CPU 10a performs a re-executing process of executing the process from step S1 to step S12 again.

In the re-executing process, if the CPU 10a has selected the pair of the coordinate system $C_{B1}$ and the coordinate data $^{B1}P_t$ in step S23 performed before, the CPU 10a selects the pair of the coordinate system $C_{B2}$ and the coordinate data $^{B2}P_t$ in step S23 currently performed. If the CPU 10a has selected the pair of the coordinate system $C_{B2}$ and the coordinate data $^{B2}P_t$ in step S23 performed before, the CPU 10a selects the pair of the coordinate system $C_{B3}$ and the coordinate data $^{B3}P_t$ in step S23 currently performed. By processing all the pairs, the same effect as the first embodiment is attained and the entire operation of causing the grasped object 2A having the band shape to pass the through-hole 3b of the object 3A can be realized.

Fifth Embodiment

Figure 10:
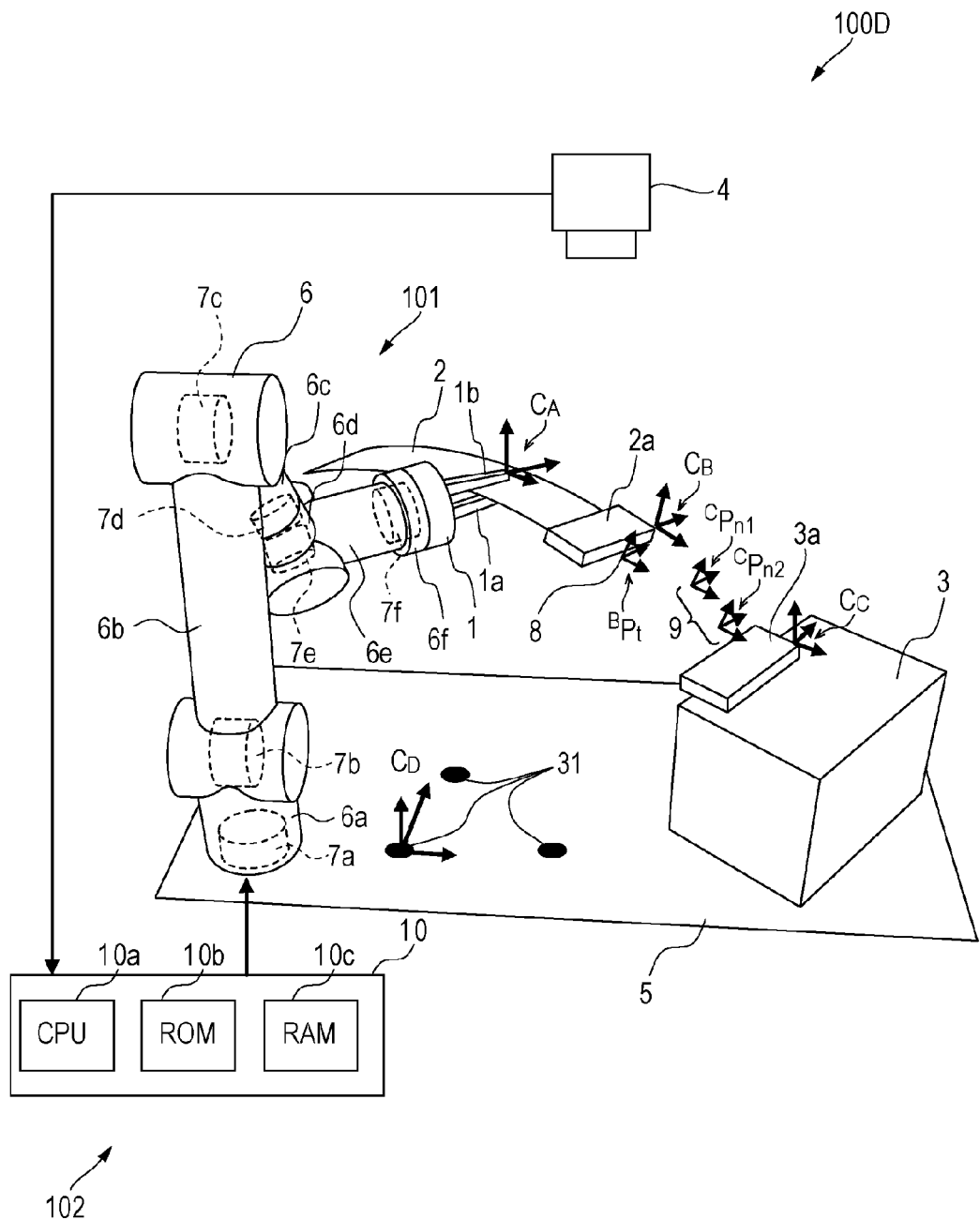
FIG. 10 is a diagram schematically illustrating a configuration of a robot according to a fifth embodiment of the present invention.

Next, a robot according to a fifth embodiment of the present invention will be described. FIG. 10 is a diagram schematically illustrating a configuration of a robot 100D according to the fifth embodiment of the present invention. Note that, in FIG. 10, components the same as those of the first embodiment are denoted by reference numerals the same as those of the first embodiment.

The fifth embodiment is different from the first embodiment in positions of coordinate systems disposed for generation of operation instructions of a robot body 101. When a high-accuracy robot is used, the coordinate systems used for the operation instructions of the robot body 101 are not required to be fixed to a hand unit 1.

In the fifth embodiment, as illustrated in FIG. 10, three position marks 31 are marked on a base 5 as base feature points. Relative positions between the position marks 31 and an attachment position of the robot body 101 are measured in advance, that is, obtained in advance.

Figure 3:
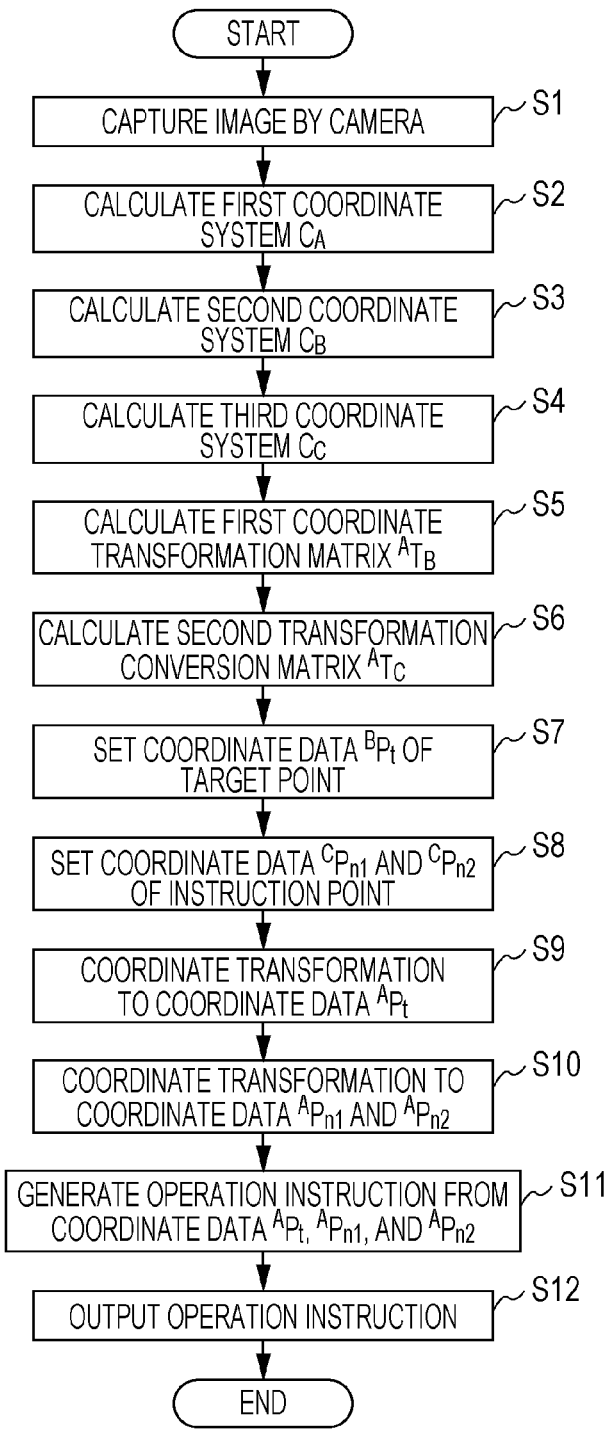
FIG. 3 is a flowchart illustrating an operation of a robot control apparatus according to the first embodiment of the present invention.

Although an operation of a robot control apparatus 102 is substantially the same as that of the first embodiment and an operation the same as that illustrated in FIG. 3 is performed in the fifth embodiment, objects to be captured in step S1 and a process of calculating a first coordinate system $C_A$ performed in step S2 are different from those of the first embodiment.

In the fifth embodiment, a CPU 10a captures the position marks 31, a cable 2, and a connector 3a using a camera 4 so as to obtain image data in step S1. The relative positional relationship between the robot body 101 (or an attachment position thereof) and the position marks 31 on the base 5 is obtained in advance.

In step S2, first, the CPU 10a calculates a base coordinate system $C_D$ representing a position and orientation of the base 5 in a camera coordinate system of the camera 4 by extracting the position marks 31 from the image data obtained by the image capturing. A method for obtaining the base coordinate system $C_D$ from the three position marks 31 is the same as the method described with reference to FIG. 4 in the first embodiment. Note that the position marks 31 preferably have black oval shapes so that analysis of the image data is facilitated. After obtaining the base coordinate system $C_D$, the CPU 10a calculates a first coordinate system $C_A$ representing a position and orientation of the hand unit 1 in the camera coordinate system of the camera 4 from the base coordinate system $C_D$ in accordance with the direct kinematics. Specifically, the coordinate system $C_A$ of the hand unit 1 can be obtained since joint angles of the robot body 101 are obtained in advance. This is a matter of the direct mechanics and formulated.

As described above, the coordinate system $C_A$ can be obtained in accordance with the direct kinematics by obtaining the coordinate system $C_D$ fixed to the base 5 instead of direct obtainment of the coordinate system $C_A$ of the hand unit 1. Operations in step S3 to step S12 to be performed are the same as those of the first embodiment, and therefore, descriptions thereof are omitted.

Since an error of the transformation of the coordinate system $C_D$ into the coordinate system $C_A$ is small in the high-accuracy robot, the method described above is effective. Therefore, according to the fifth embodiment, if the base feature points of the base 5 to which the robot body 101 is attached are measured using the camera 4, a measurement of the hand unit 1 is not required.

Note that, although the case where the position marks 31 are marked on the base 5 has been described in the fifth embodiment, the position marks 31 are not necessarily used as long as a position and orientation of the base 5 to which the robot body 101 is attached is recognized using the camera 4. Arbitrary feature points of the base 5, for example, angles or edge lines, may be set as base feature points. Even in this case, the base coordinate system $C_D$ may be obtained.

Furthermore, although the base coordinate system $C_D$ is fixed to the base 5 in the fifth embodiment, the base coordinate system $C_D$ may be fixed to a portion of the robot body 101, a wrist portion or an elbow portion of an arm unit 6. According to the mechanics (direct kinematics) of the robot engineering, the coordinate system $C_A$ of the hand unit 1 can be obtained from the coordinate system $C_D$ fixed to the portion of the robot body 101 and the joint angles. That is, the feature points used for calculation of the coordinate system $C_D$ may be set to the arm unit 6 of the robot body 101.

The present invention has been described hereinabove on the basis of the first to fifth embodiments. However, the present invention is not limited to these.

A position of a coordinate system which has been measured once among the three coordinate systems $C_A$, $C_B$, and $C_C$ may be stored in a memory so that a redundant measurement operation is omitted. Specifically, only one measurement is required for a coordinate system, among the three coordinate systems, which always has the same state or which does not move relative to the camera. Therefore, results of measurements of the three coordinate systems, a value of a coordinate system which does not move in the measurements performed a number of times may be stored in the memory. In this way, a redundant measurement can be omitted. By this, since a period of time required for the measurement can be omitted, reduction of a period of time required for an assembly operation can be attained. For example, in a case of an on-hand camera, if a hand unit is located in the same position in all captured images, the measurement is not required to be performed every times. Measurements other than the first measurement can be omitted and a preceding measurement value may be used. Furthermore, if a second workpiece does not move relative to a camera, measurements other than the first measurement may be omitted and a preceding measurement value may be obtained.

Furthermore, a recording medium which stores programs to be read by a computer is not limited to a ROM, and an HDD, a medium such as a CD or a DVD, or a non-volatile memory such as a USB may be used as the recording medium. That is, any recording medium may be used as long as the recording medium stores the programs in a computer-readable manner.

Then programs which cause the computer to realize the functions of the first to fifth embodiments may be supplied to the computer through a network or various recording media and the computer may read and execute program codes. In this case, the programs and the computer readable recording medium which stores the programs are also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-066000, filed Mar. 24, 2011, which is hereby incorporated by reference herein in its entirety.

REFERENCE SIGNS LIST

1 Hand unit
2 Flexible cable (first workpiece)
2a Connector
3a Connector (second workpiece)
4 Camera
5 Base
6 Arm unit
6a to 6f Link member
10 Robot controller
10a CPU
10b ROM
10c RAM
11 First coordinate system calculation unit
12 Second coordinate system calculation unit
13 Third coordinate system calculation unit
14 First coordinate transformation matrix calculation unit
15 Second coordinate transformation matrix calculation unit
16 Target-point setting unit
17 Instruction-point setting unit
18 First coordinate transformation unit
19 Second coordinate transformation unit
20 Operation instruction generation unit
21 Operation instruction output unit
101 Robot body
102 Robot control apparatus

The invention claimed is:

1. A robot control apparatus controlling a robot body including an arm unit having a plurality of link members coupled with one another and a hand unit which is disposed at an end of the arm unit, which grasps a first workpiece, and which attaches the grasped first workpiece to a second workpiece, the robot control apparatus, comprising:
  a camera configured to output image data obtained by capturing an image of the robot body, the first workpiece, and the second workpiece;
  a first coordinate system calculation unit configured to calculate a first coordinate system representing a position and orientation of the hand unit in a camera coordinate system of the camera from the image data;
  a second coordinate system calculation unit configured to calculate a second coordinate system representing a position and orientation of the first workpiece in the camera coordinate system of the camera from the image data;
  a third coordinate system calculation unit configured to calculate a third coordinate system representing a position and orientation of the second workpiece in the camera coordinate system of the camera from the image data;
  a first coordinate transformation matrix calculation unit configured to calculate a first coordinate transformation matrix used to transfer the second coordinate system into the first coordinate system;
  a second coordinate transformation matrix calculation unit configured to calculate a second coordinate transformation matrix used to transfer the third coordinate system into the first coordinate system;
  a target-point setting unit configured to set, in a coordinate system of the first workpiece, coordinate data of a target point having a constant position and orientation relative to the first workpiece;
  an instruction-point setting unit configured to set, in a coordinate system of the second workpiece, coordinate data of an instruction point which allows the target point to pass in a constant position and orientation relative to the second workpiece;
  a first coordinate transformation unit configured to perform coordinate transformation on the coordinate data of the target point set by the target-point setting unit using the first coordinate transformation matrix;
  a second coordinate transformation unit configured to perform coordinate transformation on the coordinate data of the instruction point set by the instruction-point setting unit using the second coordinate transformation matrix;
  an operation instruction generation unit configured to generate operation instructions for operating the robot body so that the robot body traces a trajectory obtained such that the coordinate data of the target point which has been subjected to the coordinate transformation by the first coordinate transformation unit passes a position of the coordinate data of the instruction point which has been subjected to the coordinate transformation by the second coordinate transformation unit; and
  an operation instruction output unit configured to output the operation instructions generated by the operation instruction generation unit to the robot body.

2. A robot control method for controlling a robot body including an arm unit having a plurality of link members coupled with one another and a hand unit which is disposed at an end of the arm unit, which grasps a first workpiece, and which attaches the grasped first workpiece to a second workpiece, the robot control method, comprising:
  an image capturing step of obtaining image data by capturing an image of the robot body, the first workpiece, and the second workpiece using a camera;
  a first coordinate system calculation step of calculating a first coordinate system representing a position and orientation of the hand unit in a camera coordinate system of the camera from the image data;
  a second coordinate system calculation step of calculating a second coordinate system representing a position and orientation of the first workpiece in the camera coordinate system of the camera from the image data;
  a third coordinate system calculation step of calculating a third coordinate system representing a position and orientation of the second workpiece in the camera coordinate system of the camera from the image data;
  a first coordinate transformation matrix calculation step of calculating a first coordinate transformation matrix used to transfer the second coordinate system into the first coordinate system;
  a second coordinate transformation matrix calculation step of calculating a second coordinate transformation matrix used to transfer the third coordinate system into the first coordinate system;
  a target-point setting step of setting, in a coordinate system of the first workpiece, coordinate data of a target point having a constant position and orientation relative to the first workpiece;
  an instruction-point setting step of setting, in a coordinate system of the second workpiece, coordinate data of an instruction point which allows the target point to pass in a constant position and orientation relative to the second workpiece;
  a first coordinate transformation step of performing coordinate transformation on the coordinate data of the target point set in the target-point setting step using the first coordinate transformation matrix;

a second coordinate transformation step of performing coordinate transformation on the coordinate data of the instruction point set in the instruction-point setting step using the second coordinate transformation matrix;

an operation instruction generation step of generating operation instructions for operating the robot body so that the robot body traces a trajectory obtained such that the coordinate data of the target point which has been subjected to the coordinate transformation in the first coordinate transformation step passes a position of the coordinate data of the instruction point which has been subjected to the coordinate transformation in the second coordinate transformation step; and an operation instruction output step of outputting the operation instructions generated in the operation instruction generation step to the robot body.

3. A robot control method for controlling a robot body which is fixed to a base and which includes an arm unit having a plurality of link members coupled with one another and a hand unit which is disposed at an end of the arm unit, which grasps a first workpiece, and which attaches the grasped first workpiece to a second workpiece, the robot control method, comprising:

an image capturing step of obtaining image data by capturing an image of the base, the first workpiece, and the second workpiece using a camera;

a first coordinate system calculation step of calculating a base coordinate system representing a position and orientation of the base in a camera coordinate system of the camera and thereafter calculating a first coordinate system representing a position and orientation of the hand unit in the camera coordinate system of the camera from the base coordinate system in accordance with the direct kinematics;

a second coordinate system calculation step of calculating a second coordinate system representing a position and orientation of the first workpiece in the camera coordinate system of the camera from the image data;

a third coordinate system calculation step of calculating a third coordinate system representing a position and orientation of the second workpiece in the camera coordinate system of the camera from the image data;

a first coordinate transformation matrix calculation step of calculating a first coordinate transformation matrix used to transfer the second coordinate system into the first coordinate system;

a second coordinate transformation matrix calculation step of calculating a second coordinate transformation matrix used to transfer the third coordinate system into the first coordinate system;

a target-point setting step of setting, in a coordinate system of the first workpiece, coordinate data of a target point having a constant position and orientation relative to the first workpiece;

an instruction-point setting step of setting, in a coordinate system of the second workpiece, coordinate data of an instruction point which allows the target point to pass in a constant position and orientation relative to the second workpiece;

a first coordinate transformation step of performing coordinate transformation on the coordinate data of the target point set in the target-point setting step using the first coordinate transformation matrix;

a second coordinate transformation step of performing coordinate transformation on the coordinate data of the instruction point set in the instruction-point setting step using the second coordinate transformation matrix;

an operation instruction generation step of generating operation instructions for operating the robot body so that the robot body traces a trajectory obtained such that the coordinate data of the target point which has been subjected to the coordinate transformation in the first coordinate transformation step passes a position of the coordinate data of the instruction point which has been subjected to the coordinate transformation in the second coordinate transformation step; and an operation instruction output step of outputting the operation instructions generated in the operation instruction generation step to the robot body.

4. The robot control method according to claim 3, wherein the target-point setting step includes a selection step, which is performed before the second coordinate system calculation step, of setting coordinate data of a plurality of target points in different coordinate systems prescribed by different feature points of the first workpiece and selecting a target point which has not passed the instruction point from among the plurality of target points, in the second coordinate system calculation step, the feature point which prescribes the coordinate system of the target point selected in the selection step is extracted and the second coordinate system is calculated using the extracted feature point, and in the first coordinate transformation step, the coordinate data of the target point selected in the selection step from among the plurality of target points set in the target-point setting step is subjected to coordinate transformation using the first coordinate transformation matrix.

5. A program which causes a computer which controls a robot body including an arm unit having a plurality of link members coupled with one another and a hand unit which is disposed at an end of the arm unit, which grasps a first workpiece, and which attaches the grasped first workpiece to a second workpiece to execute:

an image capturing step of obtaining image data by capturing an image of the robot body, the first workpiece, and the second workpiece using a camera;

a first coordinate system calculation step of calculating a first coordinate system representing a position and orientation of the hand unit in a camera coordinate system of the camera from the image data;

a second coordinate system calculation step of calculating a second coordinate system representing a position and orientation of the first workpiece in the camera coordinate system of the camera from the image data;

a third coordinate system calculation step of calculating a third coordinate system representing a position and orientation of the second workpiece in the camera coordinate system of the camera from the image data;

a first coordinate transformation matrix calculation step of calculating a first coordinate transformation matrix used to transfer the second coordinate system into the first coordinate system;

a second coordinate transformation matrix calculation step of calculating a second coordinate transformation matrix used to transfer the third coordinate system into the first coordinate system;

a target-point setting step of setting, in a coordinate system of the first workpiece, coordinate data of a target point having a constant position and orientation relative to the first workpiece;

an instruction-point setting step of setting, in a coordinate system of the second workpiece, coordinate data of an instruction point which allows the target point to pass in a constant position and orientation relative to the second workpiece;

a first coordinate transformation step of performing coordinate transformation on the coordinate data of the target point set in the target-point setting step using the first coordinate transformation matrix;

a second coordinate transformation step of performing coordinate transformation on the coordinate data of the instruction point set in the instruction-point setting step using the second coordinate transformation matrix;

an operation instruction generation step of generating operation instructions for operating the robot body so that the robot body traces a trajectory obtained such that the coordinate data of the target point which has been subjected to the coordinate transformation in the first coordinate transformation step passes a position of the coordinate data of the instruction point which has been subjected to the coordinate transformation in the second coordinate transformation step; and an operation instruction output step of outputting the operation instructions generated in the operation instruction generation step to the robot body.

6. A program which causes a computer which controls a robot body which is fixed to a base and which includes an arm unit having a plurality of link members coupled with one another and a hand unit which is disposed at an end of the arm unit, which grasps a first workpiece, and which attaches the grasped first workpiece to a second workpiece to execute:

an image capturing step of obtaining image data by capturing an image of the base, the first workpiece, and the second workpiece using a camera;

a first coordinate system calculation step of calculating a base coordinate system representing a position and orientation of the base in a camera coordinate system of the camera and thereafter calculating a first coordinate system representing a position and orientation of the hand unit in the camera coordinate system of the camera from the base coordinate system in accordance with the direct kinematics;

a second coordinate system calculation step of calculating a second coordinate system representing a position and orientation of the first workpiece in the camera coordinate system of the camera from the image data;

a third coordinate system calculation step of calculating a third coordinate system representing a position and orientation of the second workpiece in the camera coordinate system of the camera from the image data;

a first coordinate transformation matrix calculation step of calculating a first coordinate transformation matrix used to transfer the second coordinate system into the first coordinate system;

a second coordinate transformation matrix calculation step of calculating a second coordinate transformation matrix used to transfer the third coordinate system into the first coordinate system;

a target-point setting step of setting, in a coordinate system of the first workpiece, coordinate data of a target point having a constant position and orientation relative to the first workpiece;

an instruction-point setting step of setting, in a coordinate system of the second workpiece, coordinate data of an instruction point which allows the target point to pass in a constant position and orientation relative to the second workpiece;

a first coordinate transformation step of performing coordinate transformation on the coordinate data of the target point set in the target-point setting step using the first coordinate transformation matrix;

a second coordinate transformation step of performing coordinate transformation on the coordinate data of the instruction point set in the instruction-point setting step using the second coordinate transformation matrix;

an operation instruction generation step of generating operation instructions for operating the robot body so that the robot body traces a trajectory obtained such that the coordinate data of the target point which has been subjected to the coordinate transformation in the first coordinate transformation step passes a position of the coordinate data of the instruction point which has been subjected to the coordinate transformation in the second coordinate transformation step; and an operation instruction output step of outputting the operation instructions generated in the operation instruction generation step to the robot body.

7. A computer-readable recording medium which records the program set forth in claim 5.

8. The robot control method according to claim 2, wherein the target-point setting step includes a selection step, which is performed before the second coordinate system calculation step, of setting coordinate data of a plurality of target points in different coordinate systems prescribed by different feature points of the first workpiece and selecting a target point which has not passed the instruction point from among the plurality of target points, in the second coordinate system calculation step, the feature point which prescribes the coordinate system of the target point selected in the selection step is extracted and the second coordinate system is calculated using the extracted feature point, and in the first coordinate transformation step, the coordinate data of the target point selected in the selection step from among the plurality of target points set in the target-point setting step is subjected to coordinate transformation using the first coordinate transformation matrix.

9. A computer-readable recording medium which records the program set forth in claim 6.

* * * * *